US010078474B1

(12) United States Patent
Goodwin-Jette et al.

(10) Patent No.: US 10,078,474 B1
(45) Date of Patent: Sep. 18, 2018

(54) METHOD OF MAINTAINING LIST OF SCRATCH VOLUMES IN SHARED FILESYSTEMS ACROSS MULTIPLE NODES

(75) Inventors: Sandra J. Goodwin-Jette, Hudson, NH (US); Larry W. McCloskey, Burlington, MA (US)

(73) Assignee: EMC CORPORATION, Hopkinton, MA (US)

( * ) Notice: Subject to any disclaimer, the term of this patent is extended or adjusted under 35 U.S.C. 154(b) by 619 days.

(21) Appl. No.: 13/538,332

(22) Filed: Jun. 29, 2012

(51) Int. Cl.
*G06F 3/06* (2006.01)

(52) U.S. Cl.
CPC .................................. *G06F 3/0686* (2013.01)

(58) Field of Classification Search
CPC ......... G06F 17/30117; G06F 17/30126; G06F 17/30067; G06F 3/0686; G06F 3/0631; G06F 3/0665
USPC .......................................................... 707/624
See application file for complete search history.

(56) References Cited

U.S. PATENT DOCUMENTS 5,473,772 A * 12/1995 Halliwell et al. ............. 717/171
5,475,834 A * 12/1995 Anglin ................ G06F 11/1469 707/640
5,991,774 A * 11/1999 Tate et al. ..................... 707/697
6,067,599 A * 5/2000 Kishi et al. ................... 711/113
6,202,121 B1 * 3/2001 Walsh et al. .................. 711/100
6,304,880 B1 * 10/2001 Kishi ............................ 711/114
6,560,615 B1 * 5/2003 Zayas ................. G06F 11/1451 707/646
6,779,077 B1 * 8/2004 Bakke et al. ................. 711/111
6,820,122 B1 * 11/2004 Mandler et al. .............. 709/226
7,243,075 B1 * 7/2007 Shaffer et al. ............... 705/7.34
9,100,330 B1 * 8/2015 Noveck ................. H04L 47/283
9,471,233 B1 * 10/2016 Goodwin-Jette ..... G06F 3/0686
9,740,707 B2 * 8/2017 Lacapra ............ G06F 17/30206
2002/0138483 A1 * 9/2002 Bretl et al. ........................ 707/8
2004/0006603 A1 * 1/2004 Haury ........................... 709/207
2005/0268136 A1 * 12/2005 Kostadinov et al. ......... 713/400
2006/0080536 A1 * 4/2006 Teppler ......................... 713/176
2006/0294336 A1 * 12/2006 Gibble et al. ................ 711/171
2008/0152143 A1 * 6/2008 Estelle et al. ................ 380/277
2009/0070535 A1 * 3/2009 Adkins et al. ................ 711/162
2009/0271412 A1 * 10/2009 Lacapra et al. ................. 707/10
2009/0307336 A1 * 12/2009 Hieb ............................ 709/220
2011/0093848 A1 * 4/2011 Filali-Adib et al. .............. 718/1
2011/0119678 A1 * 5/2011 Filali-Adib et al. .......... 718/105
(Continued)

*Primary Examiner* — Apu Mofiz
*Assistant Examiner* — Sheryl Holland
(74) *Attorney, Agent, or Firm* — Hamilton, Brook, Smith & Reynolds, P.C.

(57) ABSTRACT

In one embodiment, a method of updating a list of available scratchfiles at a node accessing a filesystem includes determining whether the node should update the list of available scratchfiles on the filesystem. If the node should update the list of available scratchfiles of the filesystem, the method updates the list of available scratchfiles on the filesystem. In one embodiment, the method may determine whether the list of available scratchfiles on the filesystem should be updated by determining whether another node is currently updating its scratch list for the filesystem. If it is not, then the method may further determine whether the filesystem has added a scratch volume since a previous update of the list of available scratchfiles at the node.

17 Claims, 7 Drawing Sheets

(56) References Cited

U.S. PATENT DOCUMENTS

2011/0185117 A1* 7/2011 Beeston ................ G06F 12/084
711/111
2013/0031069 A1* 1/2013 Dudgeon et al. ............. 707/704

* cited by examiner

METHOD OF MAINTAINING LIST OF SCRATCH VOLUMES IN SHARED FILESYSTEMS ACROSS MULTIPLE NODES

BACKGROUND

A virtual tape storage system can include multiple directories in which virtual tapes are mounted. Directories, and the virtual tapes mounted on the directories, can be accessed by systems coupled with the storage systems. A mainframe can be coupled with an input/output controller which communicates with the virtual tape storage system.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1A:
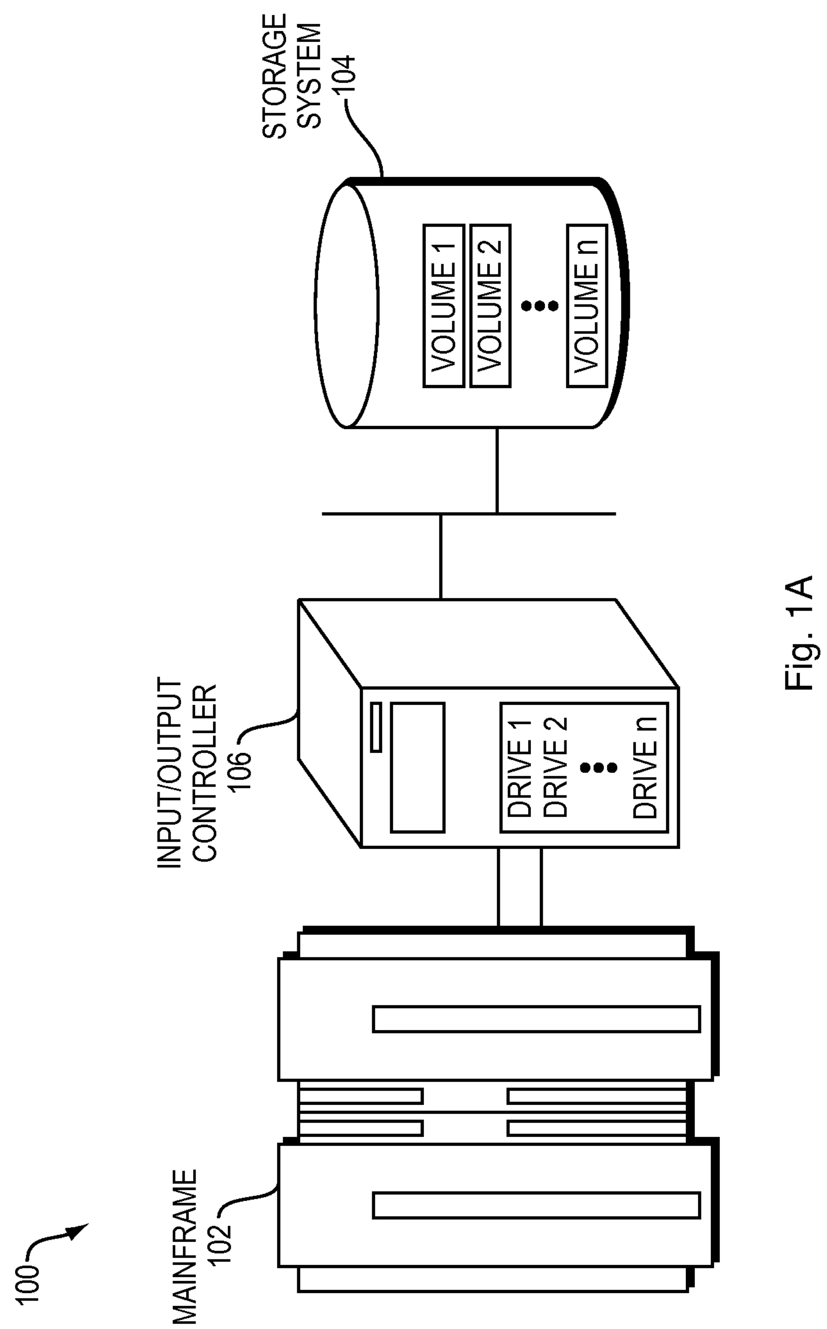
FIG. 1A is a block diagram illustrating an example embodiment employing a mainframe, which is operatively coupled with an input/output controller, which is operatively coupled with a storage system.

A description of example embodiments follows.

In one embodiment, a method of updating a list of available scratchfiles at a node accessing a filesystem includes determining whether the node should update the list of available scratchfiles on the filesystem. If the node should update the list of available scratchfiles of the filesystem, the method updates the list of available scratchfiles on the filesystem.

In another embodiment, determining whether a list of available scratchfiles on a filesystem should be updated further includes determining whether (i) another node is currently updating its scratch list for the filesystem. If (i) is determined to be false, then determining whether the list of available scratchfiles on a filesystem should be updated further includes determining whether (ii) the filesystem has added a scratch volume since a previous update of the list of available scratchfiles at the node.

In another embodiment, determining whether the filesystem has added a scratch volume since the previous check of the filesystem includes comparing a timestamp of the filesystem to a first previously recorded time stamp from the previous check of the filesystem. Further, determining whether the filesystem has added a scratch volume since the previous update of the list of available scratchfiles includes comparing the timestamp of the filesystem to a second previously recorded timestamp associated with a previous update of the list of available scratchfiles.

In another embodiment, the method may include determining a wait period before updating the list of available scratchfiles on the filesystem. The determined wait period may be a dynamic temporal interval based on a likelihood of a need to use the updated list of the particular filesystem. The method may also include determining whether any other node is updating its list for the filesystem or whether the wait period is greater than zero seconds. If either determination is false, the method may allow updating of the list and if both determinations are true, the method may prevent updating of the list.

In another embodiment, the method includes determining whether the node is updating a list of available scratchfiles for a second filesystem, and if not, allowing updating of the list.

In another embodiment, the method may perform the method at random temporal intervals.

In another embodiment, an apparatus for updating a list of available scratchfiles available at a filesystem includes a determination module is configured to determine whether the node should update the list of available scratchfiles on the filesystem. The apparatus further includes an update module configured to update the list of available scratchfiles on the filesystem, if the node should update the list of available scratchfiles of the filesystem.

In another embodiment, a non-transitory computer readable medium has computer program instructions stored thereon for updating a list of available scratchfiles at a node accessing a filesystem. The computer program instructions include updating a list of available scratchfiles at a node accessing a filesystem by determining whether the node should update the list of available scratchfiles on the filesystem, and if the node should update the list of available scratchfiles of the filesystem, updating the list of available scratchfiles on the filesystem.

FIG. 1A is a block diagram 100 illustrating an example embodiment employing a mainframe computer 102, which is operatively coupled with an input/output controller 106, which is operatively coupled with a storage system 104. The input/output controller can also be referred to as a ‘node,’ and the mainframe computer as a ‘host.’ The Disk Library for mainframe (DLm), a product of EMC Corporation of Hopkinton, Mass., is one example of an input/output controller 106. The mainframe 102 sends a request to access the storage system 104 through the input/output controller 106. The mainframe 102 can issue at least four different types of requests to the input/output controller 106.

Figure 1B:
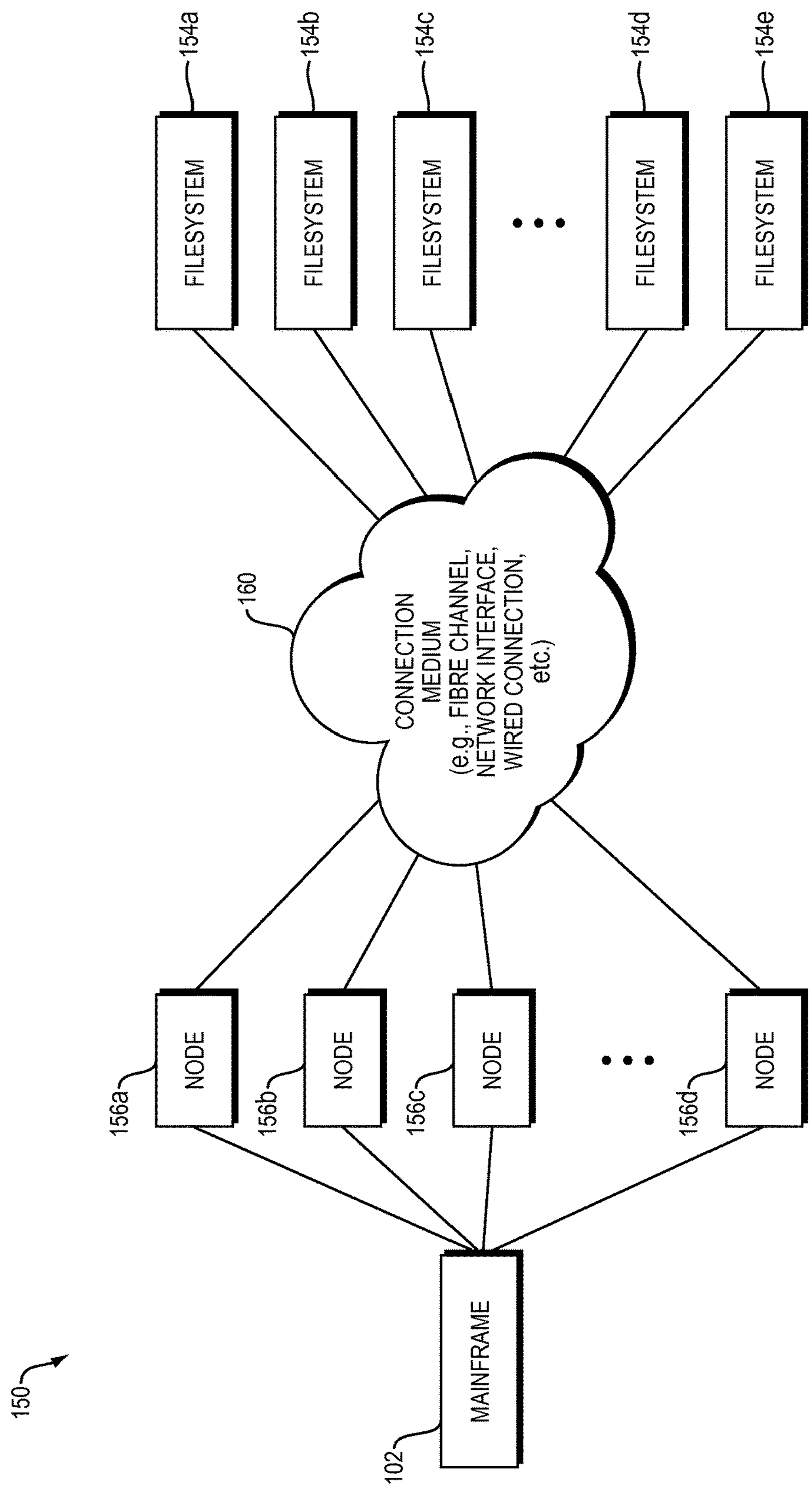
FIG. 1B is a block diagram illustrating an example embodiment employing the mainframe, a plurality of nodes, a connection medium, and a plurality of filesystems.

FIG. 1B is a block diagram 150 illustrating an example embodiment employing the mainframe computer 102 a plurality of nodes 156*a*-156*d*, a connection medium 160, and a plurality of filesystems 154*a*-154*e*. The mainframe 102 is analogous to the mainframe 102 of FIG. 1A. Similarly, a person of ordinary skill in the art can recognize that the plurality of nodes 156*a*-156*d* of FIG. 1B are each individually analogous to the input/output controller 106 of FIG. 1A. In other words, node 156*a* of FIG. 1B represents a single input/output controller 106 of FIG. 1A. Likewise, a person of ordinary skill in the art can further recognize that each of the plurality of filesystems 154*a*-154*e* of FIG. 1B are individually analogous to the storage system 104 of FIG. 1A. In other words, for example, filesystem 154*a* is analogous to a single storage system 104 of FIG. 1A.

The mainframe 102 is configured to access scratchfiles located in the plurality of the filesystems 154*a* via the plurality of nodes 156*a*-156*d* and the connection medium 160. A scratch file is a temporary file, located on a filesystem 154*a*, used to temporarily store files. Each node 156*a*-156*d* is configured to create, store, and maintain its own list of scratchfiles for each filesystem 154*a*-154*e* connected to the particular node. The workload placed on a node 156*a*-156*d* needed for building a list of scratchfiles can be intensive. The size of each filesystem 154*a*-154*e* can be relatively large and scanning through a large filesystem 154*a*-154*e* can take a long time to complete. Each filesystem 154*a*-154*e* includes its own scratchhint file (also known as a '.scratchhint' file), which is a timestamp of a last time a scratch volume was added to the filesystem 154*a*-154*e*. The scratchhint file is described in further detail in connection with FIG. 3A.

Returning to FIG. 1B, each of the filesystems 154*a*-154*e* include a scratchprocess file (also known as a ".scratchprocess file"). The scratchprocess file is a timestamp, in a particular filesystem, of a most recent scratch list update for the particular filesystem from any node. The scratchprocess file is described in further detail in connection with FIG. 3B.

In one embodiment, the system described herein provides an efficient method and apparatus for multiple nodes 156*a*-156*d* to maintain an accurate list of scratch volumes stored on a plurality of shared filesystems 154*a*-154*e*. The method and apparatus described herein helps prevent collisions, excessive filesystem input/output load, and repeated updates of scratch lists by each node during scratch processing.

The scratchhint file can be used by each node 156*a*-156*d* to determine whether it should update its scratch list. The scratchhint file alone, however, does not prevent collisions, excessive filesystem input/output load, or repeated update of the scratch list by each node during scratch processing. Therefore, in one embodiment, each node 156*a*-156*d* is configured to run a separate process or thread that, based on information stored in a particular filesystem 154*a*-154*e*, determines whether the node 156*a*-156*d* needs to update its scratch list file. By determining whether a node 156*a*-156*d* needs to update its scratch list file, the node 156*a*-156*d* can limit unnecessary accesses to the filesystem 154*a*-154*e*, and therefore increase performance.

Figure 2:
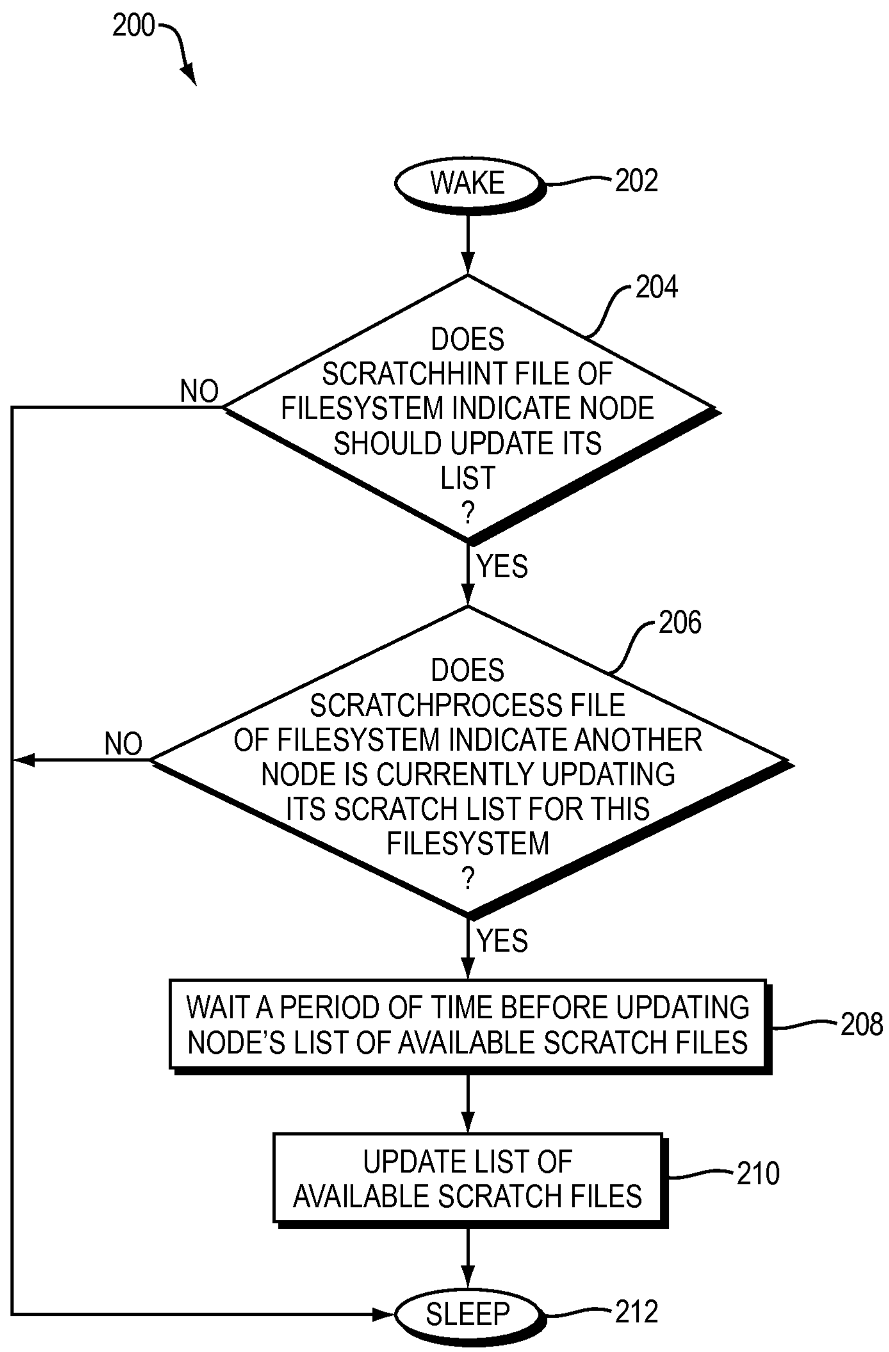
FIG. 2 is a flow diagram of an example embodiment.

FIG. 2 is a flow diagram 200 of an example embodiment. of a process The process begins by waking a thread (202) in one of the nodes 156*a*-156*d* illustrated in FIG. 1A and FIG. 1B. After waking, the thread determines whether the scratchhint file of the corresponding filesystem indicates that the node running the thread should update its list of scratchfiles (204). The scratchhint file can be named other identifiers. The function of the scratchhint file can remain the same across different identifiers or names. If the thread determines that the node should not update its list, the thread sleeps (212).

On the other hand, if the thread determines that the node should update its list based on the scratchhint file of the filesystem (204), then the thread waits a period of time before updating the node's list of available scratchfiles (206). Then, the thread determines whether the scratchprocess file of the filesystem indicates that another node is currently updating its scratch list for this filesystem (208). If the scratchprocess file indicates that another node is currently updating its scratch list for this filesystem, the thread goes to sleep (212). Otherwise, if the scratchprocess file of the filesystem indicates that no other node is currently updating its scratch list for the filesystem, the thread then updates the list of available scratchfiles (210). In another embodiment, after waiting the period of time (206), the thread wakes again (202). Then, the thread goes to sleep (212).

In one embodiment, the thread waits a dynamic period of time (206) where the dynamic period of time can be based on a need of the node to update its scratch list. For example, a node with a scratch list of many available scratchfiles has a lower need to update its scratch list than a node with a scratch list of fewer, or no, available scratchfiles. Therefore, the node with the scratch list with many available scratchfiles can wait to update its scratch list, where the node with fewer available scratchfiles cannot wait as long. A designer of the system and method described herein can adjust the dynamic periods of time to meet a particular system's needs.

Figure 3A:
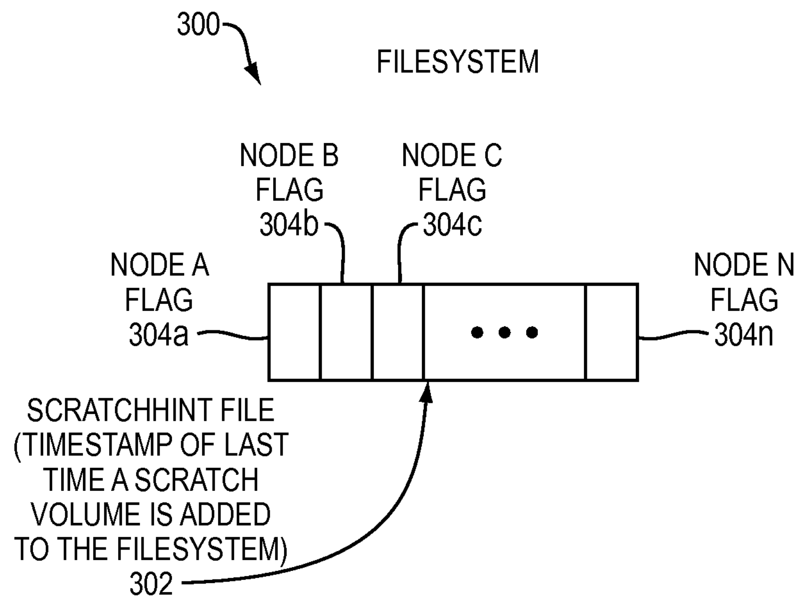
FIG. 3A is a diagram of an example embodiment of a scratchhint file.

FIG. 3A is a diagram 300 of an example embodiment of a scratchhint file 302. The scratchhint file 302 includes timestamps, each timestamp indicating of a last time a scratch volume is added to the filesystem for a particular node. For example, node A flag 304*a* would include the timestamp of a last time a scratch volume is added to the filesystem for a node A. Likewise, node B flag 304*b* includes a timestamp of a last time a scratch volume is added to the filesystem from node B, node C flag 304*c* includes a timestamp of the last time a scratch volume is added to the filesystem for node C, and node N flag 304*n* includes a timestamp of last time a scratch volume is added to the filesystem for a node N, where node N represents any node in the system, and where the system is expandable or contractible to any amount of nodes.

Figure 3B:
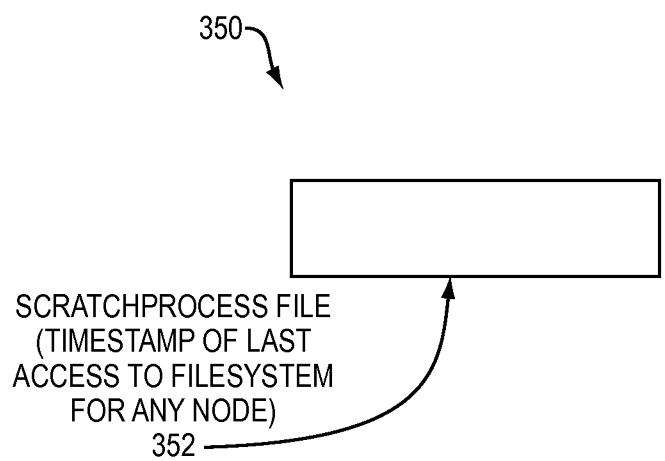
FIG. 3B is a diagram of a scratchprocess file.

FIG. 3B is a diagram 350 of a scratchprocess file 352. The scratchprocess file 352 is a timestamp, stored in a particular filesystem, of the most recent start of a scratch list update for the particular filesystem for any node. Unlike the scratchhint file 302 of FIG. 3A, the scratchprocess file 352 of FIG. 3B does not include timestamps for each of the individual nodes. Instead, the scratchprocess file 352 includes one timestamp of any last access to the filesystem for any node. In other words, the scratchprocess file 352 includes a timestamp of a last access to the filesystem that is agnostic to which node accessed the filesystem. Likewise, each filesystem has one scratchprocess file 352 that contains one timestamp of a last access to that filesystem from any node.

Figure 4:
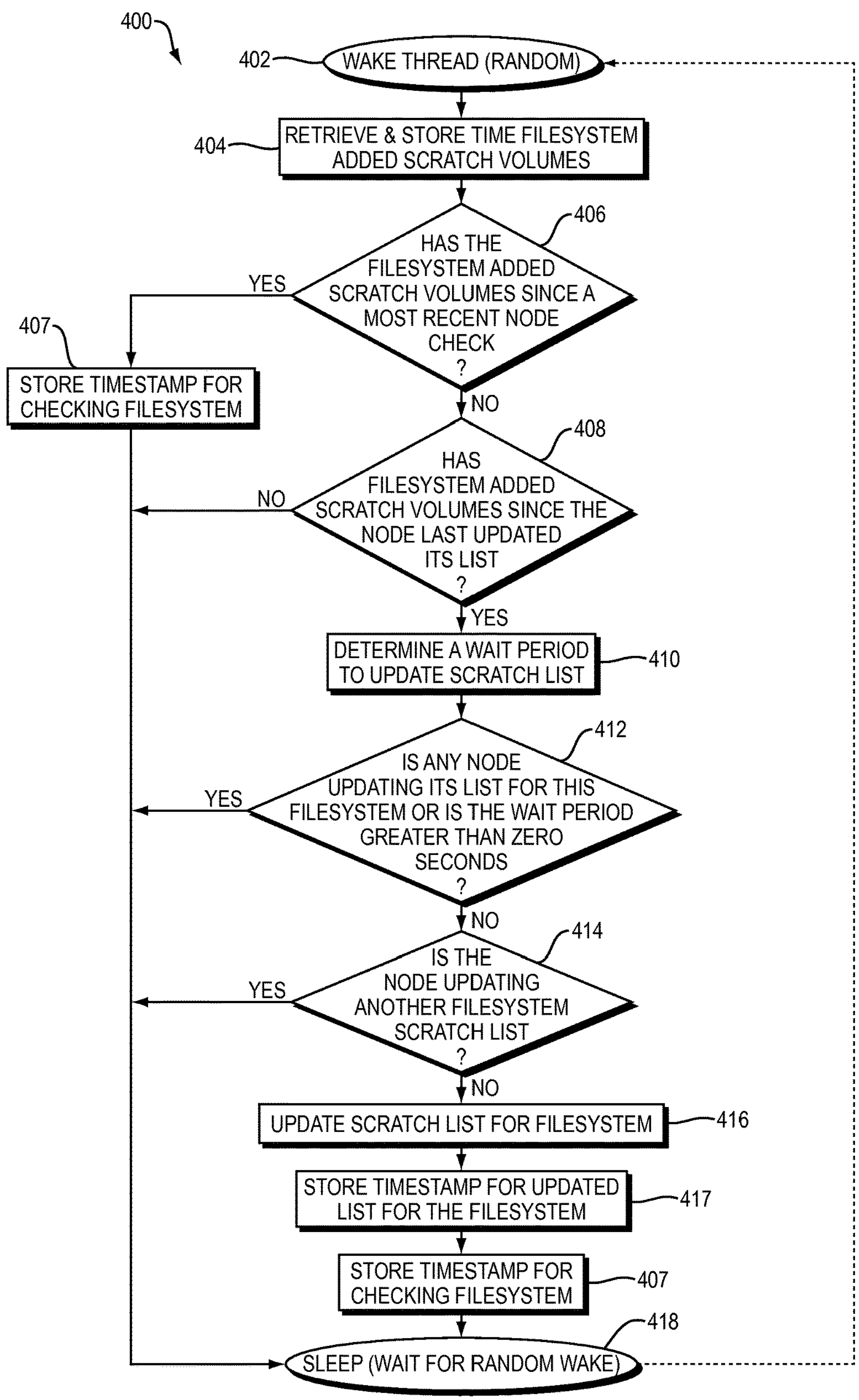
FIG. 4 is a flow diagram illustrating an example embodiment of the thread described in this application.

FIG. 4 is a flow diagram 400 illustrating an example embodiment of the thread described in this application. The thread begins by waking (402). The thread can wake randomly. Next, the thread retrieves and stores a time that the filesystem last added scratch volumes (404). The thread subsequently determines whether the filesystem has added scratch volumes since a most recent node check (406). In other words, the node determines whether the filesystem has added scratch volumes since the last time the node running the thread checked the filesystem for any additional scratch volumes. If the filesystem has added one or more scratch volumes since the most recent node check (406) the thread sleeps (418). While sleeping, the thread waits for a wake (402) (e.g., a random wake).

If the filesystem has not added scratch volumes since a most recent node check, the node determines whether the filesystem has added one or more scratch volumes since the node last updated its list (408). In other words, the node determines whether the filesystem has added one or more scratch volumes since the last time that the node updated its list. The node can check for added scratch volumes without actually updating its list of scratch volumes. Therefore, the node tracks two timestamps, the two timestamps being (1) a timestamp indicating the last time the node attempted to check the filesystem for added scratch volumes, and (2) a timestamp indicating the last time the node updated its list of scratch volumes for the given filesystem. If the filesystem has not added a scratch volume since the last time the node updated its list, the thread sleeps (418). If the filesystem has added scratch volume since the node last updated its list, the thread determines a wait period to update its scratch list (410). The wait period, as described herein, is based on a need of the node to update its scratch list.

The thread then determines whether any node is updating its list for the particular filesystem or whether the wait period is greater than zero seconds. If either condition is true, the thread sleeps (118). If a node is updating its list for the particular filesystem, then it is not ideal for a second node to also update its list for the same particular filesystem. Ideally, one node can update its scratch list for one filesystem at a time. Therefore, if another node is updating its list for the filesystem, then the node running the thread waits until the other node finishes updating its scratch list for the filesystem. Likewise, if the thread determines a wait period to update the scratch list that is greater than zero seconds, the thread can also sleep (418). In this particular sequence of events, however, the thread wakes after the determined period of time, instead of at a random time. However, in one embodiment, the determined wait period can be random, if the system is configured as such.

If neither (1) any node is updating its list for the filesystem nor (2) the wait period is greater than zero seconds, the node determines whether the node is updating a scratch list of another filesystem (414). This step is activated when neither condition (e.g., neither (1) nor (2)) of (412) is true. If either one of the conditions (e.g., (1) is true or (2) is true) of (412) are true then the thread sleeps (418).

If the node determines that the node is updating another filesystem scratch list (414), then the node sleeps (418). If the node determines that it is not updating another filesystem scratch list (414), then the node updates the scratch list, in the node, for the filesystem (416). Then, the node stores the timestamp for the updated list for this particular filesystem (417). The timestamp for the updated list is then used in (408) in subsequent executions of the thread to determine whether the filesystem has added new scratch volumes since the last update of its list. Then, the system stores the timestamp for checking the filesystem (407). This timestamp is used to determine whether the filesystem has added one or more scratch volumes since a most recent node check occurred.

After determining that the filesystem has added scratch files of the most recent node check, the system stores the timestamp for checking the filesystem (407) before going to sleep (418).

Figure 5:
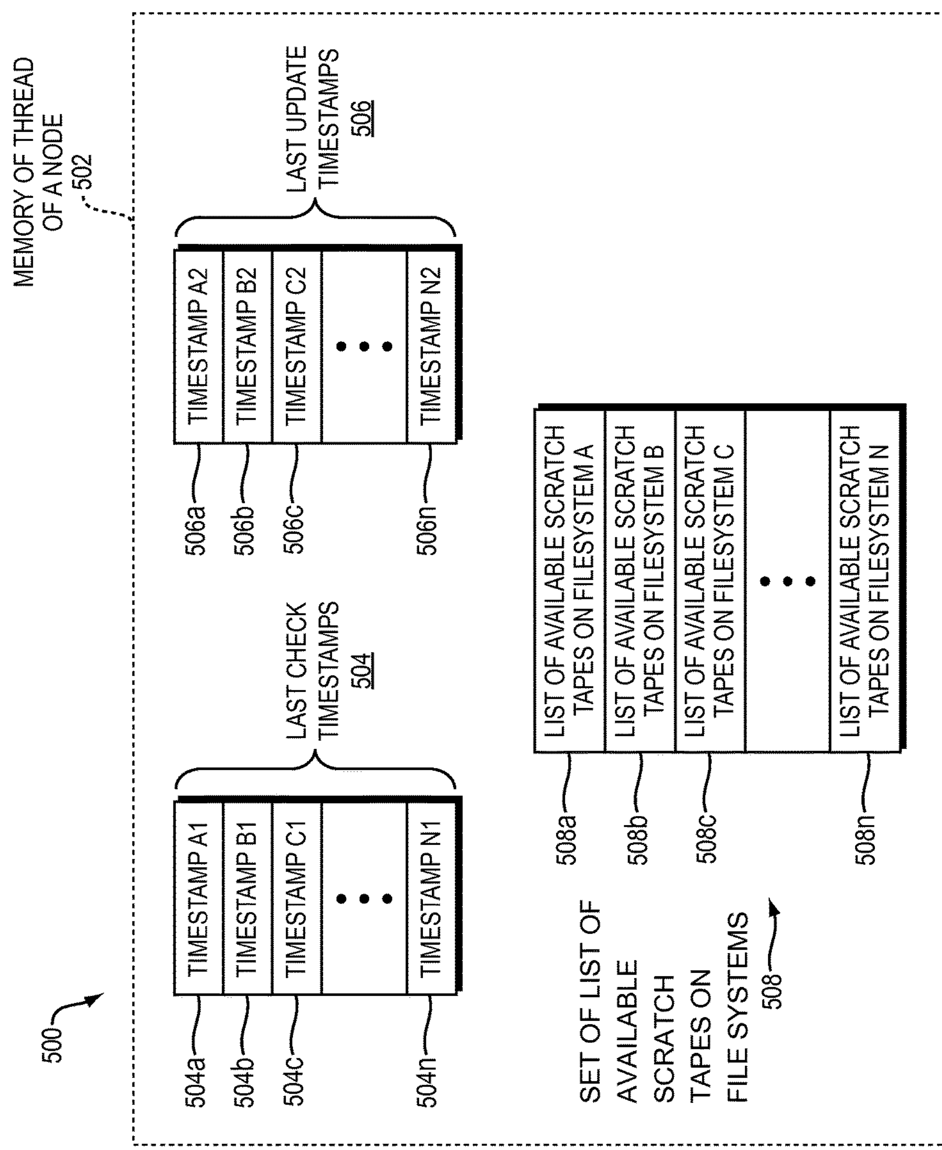
FIG. 5 is a block diagram of an example embodiment of a memory of a thread of a node.

FIG. 5 is a block diagram 500 of an example embodiment of a memory 502 of a thread of a node 502. The memory 502 stores last check timestamps 504, last update timestamps 506, and a set of list of available scratch tapes on filesystems 508.

The last check timestamps 504 include a plurality of timestamps 504*a*-504*n* of the last check of the filesystem for particular note. For example, the memory stores a timestamp A1 504*a* that can store a timestamp of a most recent check of filesystem a by the node. Likewise, timestamp B1 504*b* is a timestamp of a last check of filesystem B by the node, timestamp C1 504*c* is a timestamp of a last check of filesystem C by the node, and timestamp N1 504*n* is a timestamp of the last check of filesystem and by the node. The timestamp N1 504*n* corresponds to filesystem N, which represents an $N^{th}$ filesystem that can be any numbered filesystem configured to operate with the system described.

The last update timestamps 506 includes a timestamp A2 506*a*, which is a timestamp of the last update of a list of available scratchfiles on filesystem A. Likewise, timestamp B2 506*b* is a timestamp of a last update of available scratchfiles on filesystem B, timestamp C2 506*c* is the timestamp of the last update of a list of available scratchfiles and filesystems C, and so forth, such that timestamp N2 506*n* is a timestamp of the last update of a list of available scratchfiles and filesystem N.

The memory 502 also stores the set of available scratch tapes on filesystems 508. The set 508 includes a list of available scratch tapes on filesystem A 508*a*, a list of available scratch tapes on filesystem B 508*b*, a list of available scratch tapes and filesystems C 508*c*, and a list of available scratches from filesystem N 508*n*. The set 508 can include additional lists 508*a*-508*n* up to as many filesystems as the system is configured to include. Each list 508*a*-508*n* includes a list of available scratch tapes on each particular filesystem.

Figure 6:
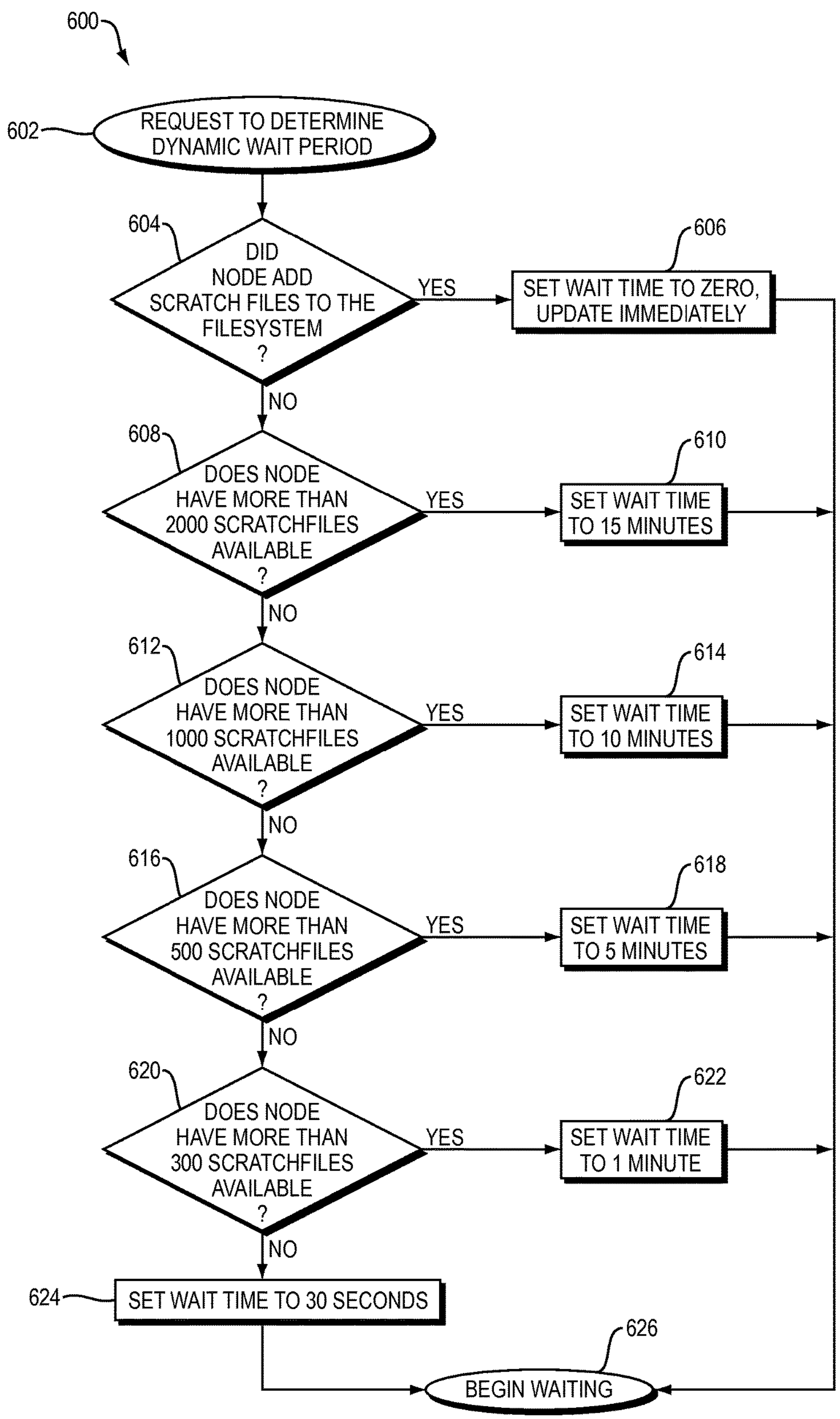
FIG. 6 is a flow diagram illustrating an example embodiment of a process employed by the nodes and threads from other nodes described herein.

FIG. 6 is a flow diagram 600 illustrating an example embodiment of a process employed by the nodes and threads described herein. In particular, the flow diagram 600 describes a process of determining a wait period for the thread when a wait period is required or recommended before the note updates its scratch file. The process described herein can be modified, especially regarding the number of scratch files and specific times listed. The flow diagram 600 illustrates example time periods, however, for particular systems, these time periods can be changed or adjusted. The times listed herein are thus for an example embodiment, and the concepts provided can be extended to different time periods that employ the same concepts.

Determining a dynamic wait period begins with a request to determine the dynamic wait period (602). Then the thread determines whether the node added scratchfiles to the filesystem (604). If the node did add scratchfiles to the filesystem, the wait time period is set to zero, such that the node will update its scratch file list immediately (606). Then the system begins waiting (626), however in this example, because the wait time period is zero, the wait period is over instantly and therefore an update occurs immediately/instantly.

If the node did not add scratch files in the filesystem (604), then the thread determines whether the node has more than 2000 scratchfiles available (608). If the node has more than 2000 scratchfiles available, the thread sets the wait time to 15 min. (610). Then, the thread begins waiting (626).

If the node does not have more than 2000 scratchfiles available, the thread determines whether the node has more than 1000 scratchfiles available (612). Effectively, because the node having more than 2000 scratchfiles available is ruled out due to the process described herein, the node checks whether it has between 1000 and 2000 scratchfiles available. If the node has between 1000 and 2000 scratchfiles available, it sets the wait time to 10 minutes (614). Then, the thread begins waiting (626).

If the node does not have more than 1000 scratchfiles available (612), then the node determines whether it has more than 500 scratchfiles available (616). In effect, the thread is determining whether the node has between 500 and 1000 scratchfiles available. If the node has more than 500 scratchfiles available (616), then the thread sets the wait time to 5 minutes (618). Then, the thread begins waiting (626).

If the node does not have more than 500 scratchfiles available, then the node determines whether it has more than 300 scratch files available. In effect, the thread is determining whether the node has between 300 and 500 scratchfiles. If the node has more than 300 scratchfiles available (620), then the thread sets the wait time to one minute (622). Then, the thread begins waiting (626).

If the node does not have more than 300 scratch files available, then the node sets the wait time to 30 seconds (624). Then the thread begins waiting (626). Setting the wait time to 30 seconds (624) is a default setting, or a catch-all setting.

Embodiments or aspects may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method of ascertaining availability of scratch files in a shared data storage system across multiple input/output (I/O) controllers, the method comprising:

in a system comprising a mainframe computer coupled to a plurality of filesystems through a plurality of I/O controllers:

establishing, by a first I/O controller of the plurality of I/O controllers, a first timestamp identifying an update time at which a first scratch list associated with a first one of the plurality of filesystems, was most recently updated by the first I/O controller, the first scratch list identifying one or more scratchfiles available for use on the first one of the plurality of filesystems;

establishing, by the first one of the plurality of filesystems, a scratchhint file comprising a second timestamp identifying an increase time at which a number of scratchfiles on the filesystem was most recently increased;

performing, by the first I/O controller, a comparison of the first timestamp and the second timestamp, and determining that the first scratch list should be updated when the comparison indicates that the second timestamp is greater than the first timestamp;

determining, by the first I/O controller, that a second I/O controller is not currently updating a second scratch list for the first one of the plurality of filesystems, the second scratch list identifying one or more scratchfiles on the first one of the plurality of filesystems available for use by the second I/O controller;

determining, by the first I/O controller, that the first one of the plurality of filesystems has added a scratchfile since the previous update of the first scratch list; and updating, by the first I/O controller, the first scratchlist when the determining determines that (i) the first scratch list should be updated, (ii) the second I/O controller is not currently updating the second scratch list, and (iii) the first one of the plurality of filesystems has added a scratchfile since the previous update of the first scratch list.

2. The method of claim 1, wherein determining, based on when the filesystem most recently added a scratchfile, whether the filesystem has added a scratchfile since a previous check of the filesystem includes comparing a timestamp of the filesystem to a first previously recorded time stamp from the previous check of the filesystem, and wherein determining whether the filesystem has added a scratchfile since a first of the one or more previous updates of the first scratch list includes comparing the timestamp of the filesystem to a second previously recorded timestamp associated with a second of the one or more previous update of the first scratch list.

3. The method of claim 1, further comprising determining a wait period before updating the first scratch list of available scratchfiles on the filesystem.

4. The method of claim 3, wherein the determined wait period is a dynamic temporal interval based on a need to update a particular scratch list of a particular filesystem.

5. The method of claim 3, further comprising (i) determining whether the second I/O controller is updating the second scratch list for the filesystem or (ii) determining whether the wait period is greater than zero seconds, wherein when either determination (i) or (ii) is false, allowing updating of the first scratch list and when both determinations (i) and (i) are true, preventing updating of the first scratch list.

6. The method of claim 1, further comprising determining whether the second I/O controller is updating the second scratch list identifying available scratchfiles for a second filesystem, and when the second I/O controller is not updating the second scratch list identifying available scratchfiles for a second filesystem, allowing updating of the first scratch list.

7. The method of claim 6, further comprising performing the method at random temporal intervals.

8. An apparatus for ascertaining availability of scratch files in a shared data storage system across multiple input/output (I/O) controllers, the apparatus comprising:

a plurality of I/O controllers configured to couple a mainframe computer to a plurality of filesystems, each individual I/O controller of the plurality of I/O controllers comprising:

a processor; and a non-transient computer readable memory with computer code instructions stored thereon, the memory operatively coupled to the processor such that the computer code instructions cause the processor to implement:

establishing a first timestamp identifying an update time at which a first scratch list, associated with a first one of the plurality of filesystems, was most recently updated by the individual I/O controller, the first scratch list identifying one or more scratchfiles available for use on the first one of the plurality of filesystems;

receiving, from a scratchhint file on the first one of the plurality of filesystems, a second timestamp identifying an increase time at which a number of scratchfiles on the first one of the plurality of the filesystems was most recently increased;

performing a comparison of the first timestamp and the second timestamp, and determining that the first scratch list should be updated when the comparison indicates that the second timestamp is greater than the first timestamp;

determining that a second I/O controller is not currently updating a second scratch list for the first one of the plurality of filesystems, the second scratch list identifying one or more scratchfiles on the first one of the plurality of filesystems available for use by the second I/O controller;

determining that the first one of the plurality of filesystems has added a scratchfile since a previous update of the first scratch list; and updating the first scratch list when the determining determines that (i) the first scratch list should be updated, (ii) the second I/O controller is not currently updating the second scratch list, and (iii) the first one of the plurality of filesystems has added a scratchfile since the previous update of the first scratch list.

9. The apparatus of claim 8, wherein the computer code instructions further cause the processor to implement determining whether the filesystem has added a scratch file since a previous check of the filesystem by comparing a timestamp of the filesystem to a first previously recorded time stamp from the previous check of the filesystem, and determining whether the filesystem has added a scratchfile since the previous update of the first scratch list of available scratchfiles by comparing the timestamp of the filesystem to a second previously recorded timestamp associated with a previous update of the first scratch list of available scratchfiles.

10. The apparatus of claim 8, wherein the computer code instructions further cause the processor to implement determining a wait period before allowing the update module to update the first scratch list of available scratchfiles on the filesystem.

11. The apparatus of claim 10, wherein the determined wait period is a dynamic temporal interval based on a need to update a particular scratch list of the particular filesystem.

12. The apparatus of claim 10, wherein the computer code instructions further cause the processor to implement (i) determining whether a second I/O controller is updating the second scratch list for the filesystem or (ii) determining whether the wait period is greater than zero seconds, wherein when either determination (i) or (ii) is false, allow updating of the first scratch list and when both determinations (i) and (ii) are true, prevent updating of the first scratch list.

13. The apparatus of claim 8, wherein the computer code instructions further cause the processor to implement determining whether the second I/O controller is updating a second scratch list identifying available scratchfiles for a second filesystem, and when the second I/O controller is not updating a second scratch list identifying available scratchfiles for the second filesystem, allow updating of the first scratch list.

14. The apparatus of claim 8, wherein the computer code instructions further cause the processor to implement performing the method at random temporal intervals.

15. A non-transitory computer readable medium having computer program instructions stored thereon for ascertaining availability of scratch files in a shared data storage system across multiple input/output (I/O) controllers, the computer program instructions comprising:

establishing, by a first I/O controller of a plurality of I/O controllers configured to couple a mainframe computer to a plurality of filesystems, a first timestamp identifying an update time at which a first scratch list, associated with a first one of the plurality of file systems, was most recently updated by the first I/O controller, the first scratch list identifying one or more scratchfiles available for use on the first one of the plurality of filesystems;

receiving, from a scratchhint file on the first one of the plurality of filesystems, a second timestamp identifying an increase time at which a number of scratchfiles on the filesystem was most recently increased;

performing a comparison of the first timestamp and the second timestamp, and determining that the first scratch list should be updated when the comparison indicates that the second timestamp is greater than the first timestamp;

determining that a second I/O controller is not currently updating the second scratch list for the first one of the plurality of filesystems, the second scratch list identifying one or more scratchfiles on the first one of the plurality of filesystems available for use by the second I/O controller;

determining that the first one of the plurality of filesystems has added a scratchfile since the previous update of the first scratch list; and updating the first scratchlist when the determining determines that (i) the first scratch list should be updated, (ii) the second I/O controller is not currently updating the second scratch list, and (iii) the first one of the plurality of filesystems has added a scratchfile since the previous update of the first scratch list.

16. The computer readable medium of claim 15, wherein determining, based on when the filesystem most recently added a scratchfile, whether the filesystem has added a scratchfile since the previous check of the filesystem includes comparing a timestamp of the filesystem to a first previously recorded time stamp from the previous check of the filesystem, and wherein determining whether the filesystem has added a scratchfile since a first of the one or more previous updates of the first scratch includes comparing the timestamp of the filesystem to a second previously recorded timestamp associated with a second of the one or more previous update of the first scratch list.

17. The computer readable medium of claim 15, further comprising determining a wait period before updating the first scratch list of available scratchfiles on the filesystem.

* * * * *